United States Patent [19]
Turnwald

[11] 3,867,958
[45] Feb. 25, 1975

[54] CRYOGENIC VALVE

[75] Inventor: Ernst Turnwald, Altenmarkt, Germany

[73] Assignee: Linde Aktiengesellschaft, Wiesbaden, Germany

[22] Filed: June 13, 1973

[21] Appl. No.: 369,732

[30] Foreign Application Priority Data
Dec. 22, 1972 Germany.......................... 2263064

[52] U.S. Cl................................ 137/375, 251/359
[51] Int. Cl................................................ F16k 1/04
[58] Field of Search ............ 137/375; 251/360, 362, 251/359, 367; 29/447; 123/188 R, 188 A, 188 S

[56] References Cited
UNITED STATES PATENTS

| | | | |
|---|---|---|---|
| 1,955,728 | 4/1934 | Allen et al. ............................ | 29/447 |
| 2,101,970 | 12/1937 | Wissler ............................. | 123/188 S |
| 2,136,690 | 11/1938 | Jardine......................... | 251/359 UX |
| 2,469,109 | 5/1949 | Goecke............................... | 137/375 |
| 2,644,662 | 7/1953 | Powers.............................. | 251/362 X |
| 2,800,122 | 7/1957 | Howell............................ | 123/188 S |
| 3,028,850 | 4/1962 | Gleeson........................... | 123/188 S |
| 3,322,143 | 5/1967 | Buschow............................. | 137/375 |
| 3,339,577 | 9/1967 | Teegarden .......................... | 137/375 |
| 3,487,823 | 1/1970 | Tarter et al..................... | 251/367 X |

FOREIGN PATENTS OR APPLICATIONS
1,148,830   5/1963   Germany ...................... 137/375

*Primary Examiner*—Henry T. Klinksiek
*Attorney, Agent, or Firm*—Karl F. Ross; Herbert Dubno

[57] ABSTRACT

A valve for a cryogenic-fluid device has a valve seat, separate from the valve housing and of a different material, secured to the housing by shrink-fitting into a recess thereof. The readily replaceable seat has a high structural strength and preferably has been subjected to an anodizing treatment. The valve seat projects axially into the path of fluid passing through the nonclosable valve port. The valve housing is made of easily weldable materials, e.g., aluminum and aluminum alloys, and flanges for pipe connections are welded to the valve housing.

2 Claims, 2 Drawing Figures

CRYOGENIC VALVE

FIELD OF THE INVENTION

My present invention relates to a valve for a cryogenic-fluid device and, more particularly, to a valve for a thermally insulated system adapted to be actuated from a location outside the insulation.

BACKGROUND OF THE INVENTION

Valves for cryogenic-fluid devices are known in the art, the elements of which are accessible from the outside and can be adjusted without disturbing the thermal insulation body surrounding the valve body.

According to one such system, the valve housing has a removable cover which is connected with the valve head by means of a flanged extension tube or sleeve surrounding the valve spindle and extending through the thermal insulation body. A drum surrounding the flanged sleeve contains pulverulent thermal insulation material which is thus prevented from falling out or shifting when the removable elements of the valve are withdrawn through the sleeve upon removal of the head. The sleeve extends to the valve head which is positioned outside the body. The valve housing contains a closure member mounted on the valve spindle and is made of separate welded parts of the same material. This kind of valve construction has some significant disadvantages:

All elements of the valve which come in working contact with each other and the fluid are subject to abrasion and wear when the valve is operated. The abrasion which results at the closure member and the seat is particularly serious. It is true that the closure member can be removed and reground now and then, but the seal for the closure member generally cannot be taken out because it is an integral part of the valve bottom which is welded to the valve wall to constitute therewith the valve housing.

Also, the seat cannot usually be made of a material of considerable structural strength because it is an integral part of the bottom which must be of a highly weldable metal, e.g., an aluminum alloy. For the most part, a metal for a cryogenic device, which has satisfactory welding properties does not have high structural strength and wear resistance.

OBJECTS OF THE INVENTION

An object of my invention is to provide a valve for a cryogenic-fluid device of the kind described in the foregoing which can be operated for a long period of time, safely and without interruption.

Another object of my invention is to provide a cryogenic valve which is economical to make and maintain.

Still another object of the invention is to provide a cyrogenic valve of low cost which obviates the afore-described drawbacks.

SUMMARY OF THE INVENTION

The above objects and other which will be apparent hereinafter, can be accomplished in accordance with my invention by making the seat designed to confront the closure member an element separate from the valve housing but secured to the bottom of the valve housing, around a port thereof.

The valve of my invention for a cryogenic-fluid device comprises, in combination with a body of thermal insulation, a sleeve which extends through the body of thermal insulation, a valve head which is secured to the sleeve on one side of the body of thermal insulation, a valve housing which is connected to the sleeve on the other side of the body of thermal insulation and has a bottom which is transversely disposed in relation to the sleeve, a port formed in the valve bottom, a valve spindle which extends into the valve housing through the sleeve and is threaded in the valve head, a closure member which is secured to the valve spindle and axially aligned with the port in the valve bottom, and finally a seat which confronts the closure member and is separate from the valve housing but secured to the valve bottom around the port.

As will be apparent hereinafter, the essential characteristics of the present invention are:

a. that the seating ring is separated from and of a different material than the housing so as to be removably received therein with the housing portions dimensioned to allow the ring to be withdrawn and inserted;

b. the ring is anchored in the housing by cold shrinkage in a recess, i.e., the housing portion defining the recess shrinks upon cooling to the cryogenic temperature to a greater extent than the ring so as to tightly hug the latter; and c. the ring projects axially beyond the housing portions formed with the recess so that the ring projects into the flow cross-section assigned to the other port.

Preferably all three conditions are found in the same valve although I may use one or more of these features in any particular valve according to the invention.

Hence, it is possible according to my invention to select a material of high structural strength for the valve seat, and this will not result in any welding problems as to the valve housing because the seat is not an integral part of any welded element of the housing. Easily weldable aluminum alloys for example are suitable materials for the bottom and the wall of the housing, whereas such a material may not be acceptable for the seat because of its comparatively low structural strength. Also, according to another feature of my invention the material the seat is made of should have higher structural strength than the material of the closure member.

According to a further feature of my invention, the surface of the valve seat is hardened by an anodizing treatment. The surface of the seat attains maximum strength and abrasion and wear can be substantially avoided. Thus, it will be sufficient to take out the closure member from time to time to regrind it. Regrinding of the seat will be practically superfluous.

According to a further feature of my invention, most durable weld seams can be attained between the housing and the pipes connected to the housing; the housing and the pipes can be made of the same weldable material, e.g., a weldable aluminum alloy, and no considerations have to be paid to the structural strength of the seat for the closure member, because the seat is not an integral member of the housing. Further, the physical properties of the seat can be selected without considering any structural consequences as to the design and making of the housing, because again the seat is not an integral member of the housing.

The valve seat can be secured to the bottom of the housing in various ways. Mechanical means can be used, e.g. by pressing the seat into a port of the housing in which a spacer sleeve has been inserted or by cementing the seat around a port. However, it is preferred to shrink-fit the valve seat in a recess in the bottom of the housing extending around the port to be closed and opening into the chamber defined by the housing. It is also preferred that the shrink-fitting is done at a low temperature.

Regrinding of the closure member to eliminate the consequences of abrasion and wear of the same and to improve the performance of the valve, can be reduced by positioning the ports of the housing and shaping the valve seat in such a way that the area where the seat confronts the closure member will fall inside the axial projection of the one of the two ports of the housing which is not provided with the seat. I found that the pressure loss of the flowing cryogenic-fluid can be decreased by this expedient. This is important because then less power is needed to convey the cryogenic-fluid.

However, forces inside the valve housing are not the only forces which can have deleterious effects on the condition of the various elements of the housing, the valve spindle and the valve seat. Movements of pipes and conduits between which the valve housing has been positioned and connected, caused by sudden temperature changes, can be damaging. These movements can result in bending stresses on on the valve spindle whereby the critical adjustments of the closure member and its seat can be impaired and regrinding or repair of these two valve elements very soon be required. To overcome this problem, I contemplate as an additional important feature of my invention that a flange of the sleeve for the valve spindle is connected with the valve head and also is connected over a bellows means (flexible joint) with an outer sheet metal shell of the cryogenic container. The valve spindle is thus allowed to move not only in an axial but also in a radial direction, whereby suddenly arising bending stresses on the spindle and resulting stresses on the closure member and its seat can be avoided.

Outwardly extending elements of the valve, such as the sleeve for the valve spindle and the drum for the thermal insulation body cannot be welded to the valve housing, because they should consist of materials having low heat conductivity. The cover of the valve housing for instance is provided with flanges with screw holes and the valve housing has corresponding holes with threaded inserts. Threaded inserts allow better compatibility between the different materials of the cover and the housing, the bore holes can be short, and an exact and firm connection between the cover and the valve housing can still be secured. This is important because the valve spindle is partly guided by the cover and the accuracy of the adjustment between the closure member and its seat is dependent on the position of the valve spindle and thus indirectly on the position of the cover.

On the other hand, the making and shaping of the valve housing can in accordance with the various features of my invention be varied more freely without effecting the possibility of maintaining a satisfactory accuracy of adjustment between the closure member and its seat, because the seat is not an integral member of the bottom of the housing. Thus, I also contemplate a development of the inventive idea to the effect that the valve housing can have a large diameter, e.g., upwardly of 150 mm, be welded of e.g., a wall portion and a bottom portion, and be provided with welded flanges around its ports to receive pipe connections. The valve housing can also have a small diameter, e.g., up to 100 mm and consist of stamped sheet metal. Consequently, my invention allows more design and dimension choices and better economy in the making of valves for cryogenic-fluid containers.

DESCRIPTION OF THE DRAWING

The accompanying drawing illustrates two embodiments of my invention. In the drawing.

SPECIFIC DESCRIPTION

Figure 1:
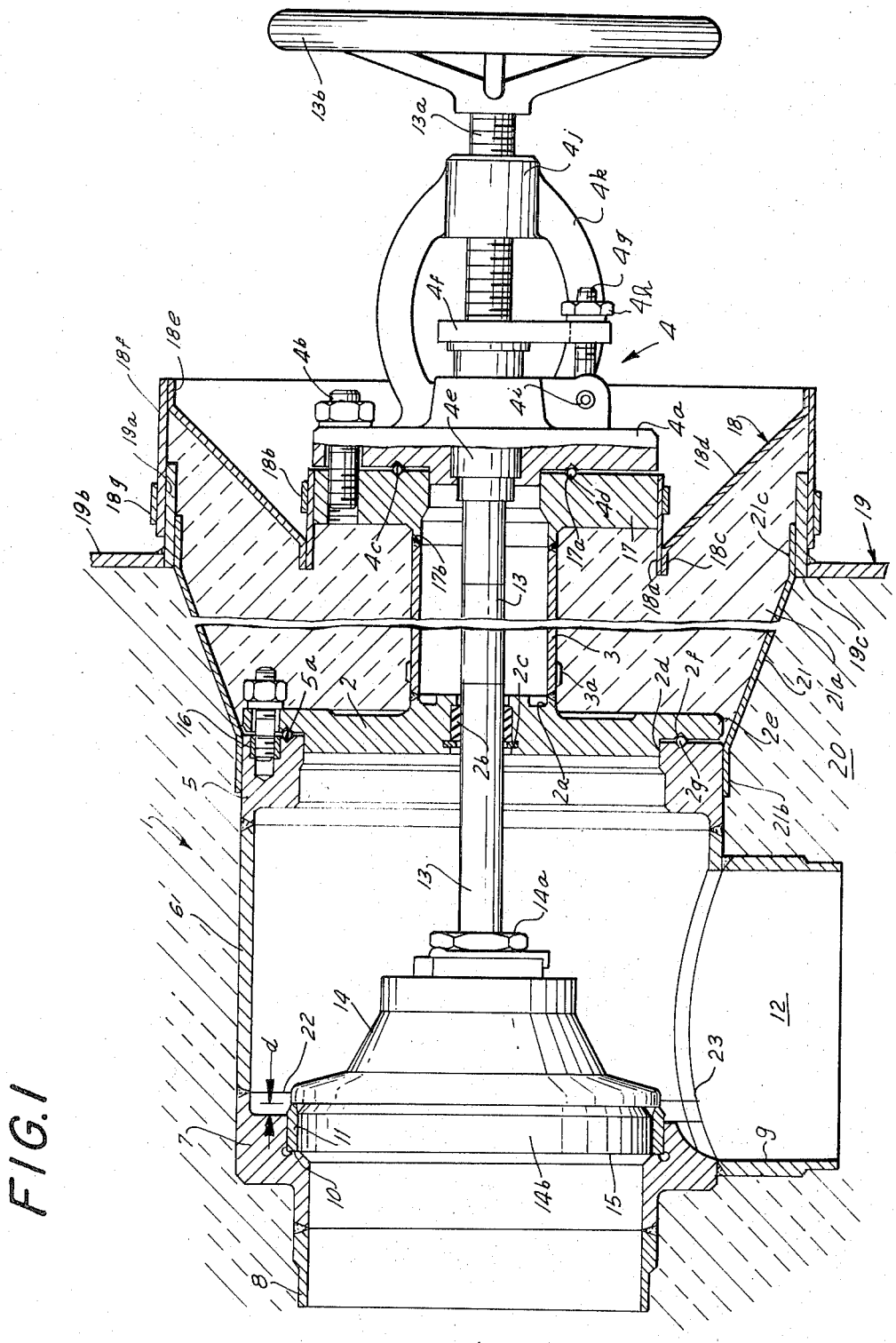
FIGS. 1 and 2 are vertical longitudinal partly sectional views of valves with the valve seat secured to the bottom of the valve housing and confronting the closure member according to the invention.

Referring now to FIG. 1, a valve of angle-type having a diameter of 150 mm consists of a valve housing 1 and a flanged cover 2. The cover 2 is connected to a spindle support 4 by means of a sleeve 3 welded to the cover 2. The valve housing 1 consists of the head flange 5, the cylindrical wall 6 and the bottom 7, welded together, and also two flanges 8 and 9 welded to the bottom 7 and the wall 6 respectively, to receive pipe connections (not shown in the drawing). A recess 10 is milled in the bottom 7, in which recess 10 an annular valve seat 11 is shrink-fitted at a low temperature. The valve seat 11 extends into an area which is inside the axial projection of the port 12 of the valve housing, surrounded by the flange 9. The valve spindle 13 is threaded in valve spindle support 4 and extends through sleeve 3 into the valve housing 1, is supported by a hole in the cover 2 and ends in a closure member 14. The closure member 14 has a plane frontal face 15 facing the bottom 7 and the inlet of cryogenic-fluid. The screw joint for the cover 2 and the head flange 5 has a threaded insert 16. The end of the sleeve 3 which is adjacent the valve spindle support 4 has a flange 17 welded threreto, and the flange 17 and the valve head 4 are connected by a screw joint. A bellows means 18 is secured to the periphery of the flange 17, and constitutes a movable connection between the flange 17 and the outer sheet metal shell 19 which confines the thermal insulation body 20. A pulverulent material is used as a thermal insulation material and a drum 21 is provided to hold this material. The drum 21 is secured around the head flange 5 and extends outwardly to the sheet metal shell 19. The inner space of the drum 21 is filled with mineral wool or the like.

The materials which the valve housing 1 are made of are easily weldable and it is not necessary to make all weld seams staggered or overlapping. They can actually be partly crossed. The circular seam 22 between the wall 6 and the bottom 7 and the circular seam 23 for the flange 9 are crossed, whereby a more compact valve design is possible.

The housing elements 5, 6 and 7 as well as the flanges 8 and 9 are made of an aluminum alloy having the following composition:

magnesium = 4.0 – 4.9 weight-percent
manganese = 0.6 – 1.0 weight-percent
chromium = 0.05 – 0.25 weight-percent
aluminum = Balance.

They are easily weldable and have a lower structural strength than the valve seat 11 and the closure member 14, which are made of aluminum alloy having the following composition:

zinc = 4.0 – 5.0 weight-percent
magnesium = 1.0 – 1.4 weight-percent manganese = 0.1 – 0.5 weight-percent
chromium = 0.1 – 0.25 weight-percent
titanium = 0.01 – 0.2 weight-percent
aluminum = balance.

The valve seat 11 should have a higher surface strength than the closure member 14. This can, for example, be accomplished by hardening the valve seat with an anodizing treatment. The cover 2, the valve spindle 13, and the sleeve 3 can be made of a chromium and nickel containing steel, which has low heat conductivity but the required structural strength.

The valve head comprises a plate 4a attached by bolts 4b to the flange 17 and provided with a recess 4c confronting a recess 17a of the flange in which an O-ring or other sealing member 4d is received. The plate 4a receives a packing sleeve 4e which sealingly engages the spindle 13 to prevent leakage therearound. The packing sleeve 4e is held in place by a plate 4f anchored by a pivotal bolt 4g and a nut 4h. The bolt 4g may be swung into a slot formed in the end of elongated plate 4f whereupon the nut 4h is tightened to lock the packing sleeve 4e in place. Of course, upon loosening of the nut 4h, the bolt 4g may be swung in the clockwise sense about its pivot axis 4i out of the slot to release the packing and the spindle when removal thereof is required. A threaded bushing 4j receives the spindle 13 at its threaded portion 13a and is attached by spider arms 4k to the plate 4a. A handwheel 13b is mounted upon the free end of the spindle beyond the boss 4j. When the spindle 13 is rotated by the handwheel 13b, therefore, the closure member 14 is moved toward and away from the valve seat 11.

The "bellows" 18 is here shown to be a frustoconical diaphragm having a cylindrical portion 18a of sheet metal which is peripherally welded to the flange 17 and may be reinforced therearound by a strap 18b. The cylindrical sheet metal portion 18a is welded coaxially to the cylindrical formation 18c of frustoconical cover 18d converging inwardly and terminating at its broad base in a cylindrical formation 18e welded to another sheet metal cylinder 18f. The latter fits over a cylindrical stanchion 19a of the housing of the cryogenic device which includes the further wall 19b whose opening 19c receives the stanchion 19a. A strap 18g fits around the cylinder 18 to hold it in place. It will be apparent that the assembly 18a through 18f flexibly supports the head 4 of the valve with some freedom of axial displacement under thermal stress.

The thin sheet metal drum 21, which retains the plug of fibrous insulation in the space 21a, comprises a cylinder portion 21b fitting over the housing ring 5 and a cylinder portion 21c fitting into the ring 19a. The drum 21 thus serves to receive the insulating plug 21a and to prevent disturbance to the cylindrical insulation in space 20.

The sleeve 3 is butt welded to a boss 2a of the housing cover plate 2 and to a boss 17b of the flange 17, a reinforcing band 3a being provided around the left-hand end of this sleeve. The sleeve passes through the cover plate 2 which may be provided with a packing 2b held in place by a spring ring 2c. The plate 2 is formed with a step 2d fitted into the ring 5 and with a flange 2e confronting an end face of this ring. The flange 2e is formed with an annular groove 2f confronting and registering with a groove 5a in the end face of ring 5 so that the grooves can receive a sealing ring 2g between them.

A nut 14a retains the valve plug or closure member 14 upon the spindle 13, the valve member 14 having an axial projection 14b which is snugly received within the seat 11 and serves to guide the valve member during its axial advance.

It is an important feature of the invention, as noted previously, that the ring 11 projects by a distance d into the path of the fluid traversing the non-blockable port 12 of the valve. In this case, the projection of the port 12 upon a plane perpendicular to its axis and to the axis of the controllable port is intercepted by the ring 11 which extends into the fluid stream generally moving toward or away from the uncontrolled outlet.

Figure 2:
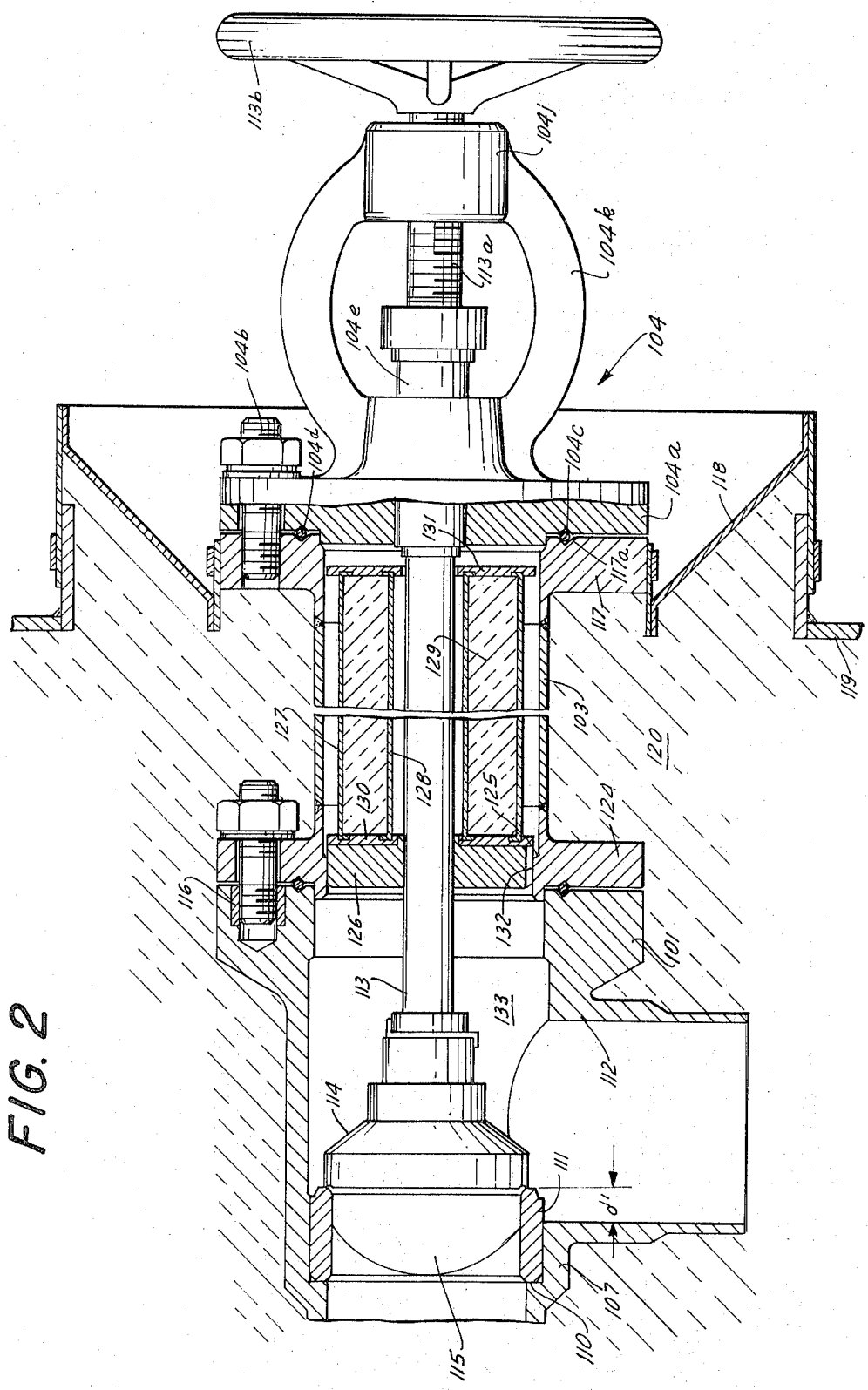

Referring to FIG. 2, a valve of angle-type having a diameter of 100 mm comprises a stamped valve housing 101. Its closure member 114 and valve spindle 113 can be taken out without loosening the bolts between the cover and the valve housing. However, the cover in this particular embodiment consists of a flange 124 secured to the valve housing 101 by bolts. The flange 124 has a milled recess 125 supporting a spindle guide sleeve 126 through which the valve spindle 113 extends.

The outer diameter of the spindle guide sleeve 126 is larger than the outer diameter of the closure member 114 so that the latter 114 together with the spindle guide sleeve 126 can be taken out. The valve spindle 113 is surrounded by two coaxially disposed thin tubes 127 and 128. These tubes are in their turn surrounded by the sleeve 103, the lower end of which is welded to the flange 124 and the upper end of which is welded to the flange 117, which is connected to the valve spindle support 104 by bolts.

The annular space 129, the so-called insulation cartridge between the tubes 127 and 128, the length of which is defined by the two covers 130 and 131, is filled with a thermal insulation material, e.g., mineral wool, which prevents heat radiation from the ambient temperature part of the valve to the cryogenic temperature part thereof.

The spindle guide sleeve 126 has three grooves 132 in its periphery so that fluid which has penetrated into the space between the cover and the valve spindle support 104 is allowed to flow back into the chamber 133 of the valve housing 101. The surface 115 of the closure member 114 which faces the bottom portion of the valve housing 101, is convex and parabolic in this embodiment, so that a better control of the amount of fluid flowing through the valve can be attained. A recess 110 is milled in the bottom 107. The valve seat 111 is shrink-fitted in this recess at a low temperature. A threaded insert 116 is provided in the bore hole for the screw joint securing the valve housing 101 of stamped metal and the flange 124, as in the embodiment illustrated in FIG. 1. Also, flange 117, with which the valve spindle support 104 is secured by a screw joint, is connected with a bellow means 118, which makes possible a movable or flexible connection with the outer sheet metal shell 119 confining the thermal insulation material 120.

In the modification of FIG. 2, the spindle 113 is again provided with a threaded portion 113a threadedly received in a boss 104j of the valve spindle support 104. The handwheel 113b on the end of the spindle 113a enables the latter to be rotated to seat or unseat the valve member or plug 114. In this embodiment the space 120 is filled with shiftable (e.g., particulate insulation) which is prevented from moving during normal maintenance of the valve (i.e., changing of the ring 111 by the fixed sleeve 103).

The valve spindle support 104 is provided with a plate 104a having a recess 104c receiving a sealing ring 104d partly received in a recess 117a of the flange 117. A spider 104k supports the threaded boss 104j while a packing assembly is provided at 104e as previously described. Bolts 104b hold the plate 104a onto the flange 117. The bellows assembly 118 has the configuration described in connection with FIG. 1.

The thin tubes 127 and 128 are shown to be recessed in annular grooves of the end walls 130 and 131 to define the insulation-filled space 129 previously described.

In this embodiment as in that of FIG. 1, the replaceable seat projects by a distance $d^1$ axially beyond the projection of the non-controlled opening 112 and hence into the straight line flow pattern of this opening.

I claim:

1. A valve for a cryogenic installation having a body of thermal insulation, said valve comprising a valve housing forming a valve chamber and provided with a pair of ports connectible in a fluid duct; a sleeve fixed to said housing and extending through said body of thermal insulation toward the exterior thereof; a valve spindle support external of said body of thermal insulation and fixed to said sleeve; a valve spindle extending axially through said sleeve and displaceable at said valve spindle support; a valve member mounted on said spindle and displaceable thereby toward and away from one of said ports; and a cylindrical smooth wall valve seat mounted in said housing around said one of said ports and engageable by said valve member, said housing being formed with a cylindrical smooth wall recess different from that of said seat whereby said recess shrinks to a greater extent than said seat and said seat is anchored into said recess by shrink fitting, said housing including a cover plate removable to afford access to said valve seat through said chamber, said sleeve being affixed to said cover plate and surrounding said spindle while being formed with a flange perpendicular to said spindle and external of said body of thermal insulation, a wall forming part of said installation and confining said body of thermal insulation, a flexible annular member connecting said flange to said wall, said valve spindle support being bolted to said flange, and an insulating cartridge received in said sleeve and interposed between said sleeve and said spindle, said annular valve seat being anchored in said recess by shrink fitting, said ports being circular and having axes lying perpendicularly to one another, said valve seat projecting annularly beyond said housing into said chamber at said one of said ports so as to lie in the axial projection of the other of said ports.

2. A valve for cryogenic installation having a body of thermal insulation, said valve comprising a valve housing forming a valve chamber and provided with a pair of ports connectible in a fluid duct; a sleeve fixed to said housing and extending through said body of thermal insulation toward the exterior thereof; a valve spindle support of said body of thermal insulation and fixed to said sleeve; a valve spindle extending axially through said sleeve and displaceable at said valve spindle support; a valve member mounted on said spindle and displaceable thereby toward and away from one of said ports; and a circular valve seat mounted in said housing around said one of said ports and engageable by said valve member, said housing being formed with a recess receiving said seat, said ports being circular and having axes lying perpendicular to one another and said valve seat projects annularly beyond said housing into said chamber at said one of said ports so as to lie in the axial projection of the other of said ports, said seat being composed of a material different from and having a greater structural strength than that of said housing.

* * * * *